UNITED STATES PATENT OFFICE.

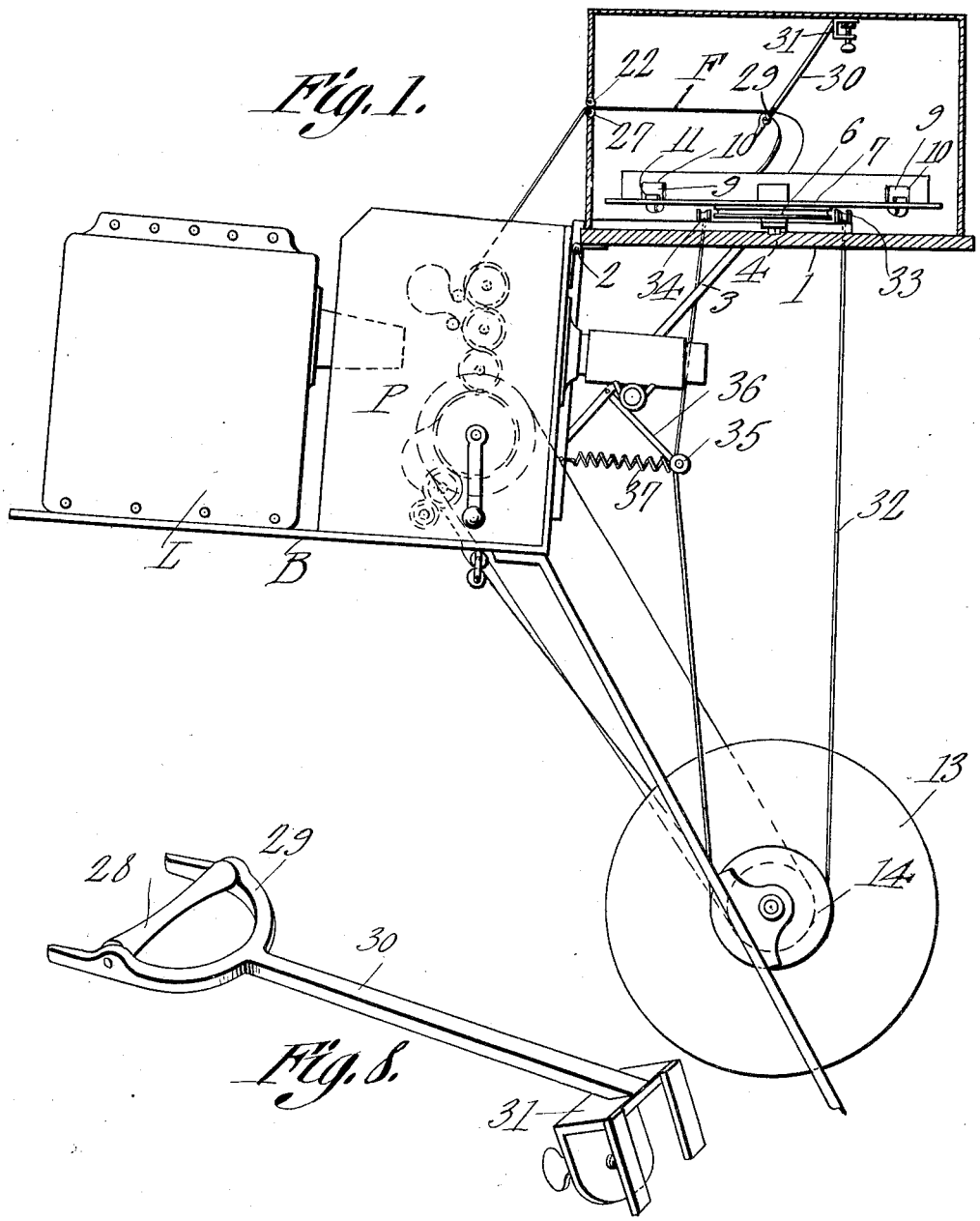

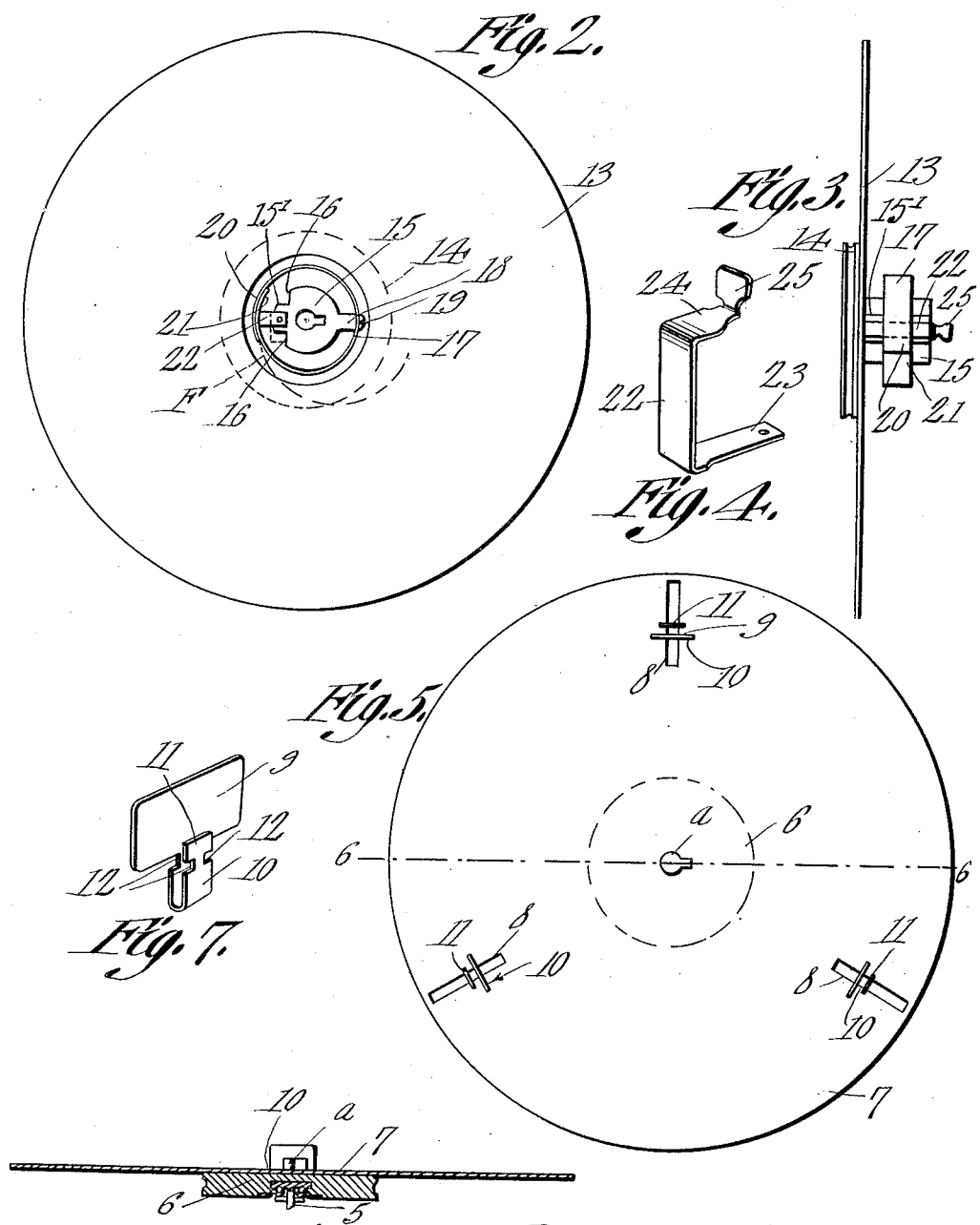

PAUL U. MASCHER, OF EAST PALESTINE, OHIO.

WINDING MECHANISM FOR MOTION-PICTURE MACHINES.

1,084,217.   Specification of Letters Patent.   Patented Jan. 13, 1914.

Application filed September 23, 1912. Serial No. 721,923.

*To all whom it may concern:*

Be it known that I, PAUL U. MASCHER, a citizen of the United States, residing at East Palestine, in the county of Columbiana and State of Ohio, have invented a new and useful Winding Mechanism for Motion-Picture Machines, of which the following is a specification.

The present invention relates to improvements in winding mechanisms for motion picture machines.

The primary object of the present invention is the provision of a means whereby the necessity of rewinding a film after the same has been presented through the projector, is dispensed with, and that the wear and tear upon such film due to the rewinding is dispensed with.

A further object of the present invention is the provision of a novel form of winding mechanism which is applicable to any form of projector, and is readily attached to the same and operated through the usual crank mechanism of the projector.

A still further object of the present invention is the provision of a novel form of clamping means for permitting the film to be wound upon the reel beginning with the center thereof, such clamping means being provided with a release device to permit of the release of the inner end of the film so that the film may be removed from the center of the roll thereof and the supply reel, thus obviating the necessity of rewinding the reel after passage through the projector.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a diagrammatic side elevation of a motion picture machine, with the present invention applied thereto, the casing retaining the supply reel being shown in section to illustrate the position of such supply reel. Fig. 2 is a top plan view of the supply reel. Fig. 3 is a side elevation thereof. Fig. 4 is a detail view of the pivoted clamp carried by the reel. Fig. 5 is a top plan view of the supporting medium for the supply reel. Fig. 6 is a section taken on line 6—6 of Fig. 5. Fig. 7 is a perspective view of one of the adjustable clamps of the supporting member as shown in Fig. 5. Fig. 8 is a perspective view of the film guide disposed for removable attachment with relation to the supply film supporting disk.

Referring to the drawings, B designates the frame of the machine, which carries the usual lamp house L, and the projector mechanism P.

Properly supported at the forward portion of the projector near the upper end thereof is a base 1 of the supply reel carrying casing which as shown is hinged at 2 to permit of the ready adjustment of the same and disposed relatively thereto and to the projector is a bracket 3, which is provided with an arm 4 which forms a journaling or supporting means for the vertical shaft 5 which anti-frictionally supports the reel supporting member which consists of the pulley 6 and the circular disk 7. This supporting disk 7, as clearly shown in Fig. 5 is provided with a plurality of slots 8 which are disposed radially and at equi-distance apart and provide guiding means for the clamping members 10, the same being clearly shown in detail in Fig. 7. This member is preferably made of a single sheet of metal and has its lower portion curved to provide the enlarged terminal 9 and the short terminal 11, the pairs of recesses 12 being disposed for registration with the side walls of the slots 8 to permit of the sliding of the member in such slots. These devices provide a means for properly supporting the film, as the plates 9 are disposed to abut the outer peripheral edge of the film roll and retain the same centered relatively to the supporting disk 7.

The wheel 13 as shown, is provided with the pulley 14 upon the under side thereof, and with the concentric abutment 15 upon the opposite side thereof, this abutment being provided with the oppositely disposed cut-away portion eccentrically disposed and has also the lug 18 formed thereupon at the opposite side to the recesses 16. Secured by means of the screw 19 to the outer face of the abutment or lug 18, is the band 17 of spring metal, the terminals 20 and 21 of which are disposed to overlap as shown in Fig. 2, and constitute a means for receiving one end of the film F therebetween when the reel is forming the film receiving reel or is vertically disposed as at the lower portion of Fig. 1. The normal tension of the terminal 21 is inwardly and away from the terminal 20, and therefore in order to clamp the terminals upon the film so as to properly retain the same when the film is being wound upon the lower reel 13 from the horizontally disposed upper reel 13, the clamping member 22 is provided. This member 22 has a terminal 23 pivotally connected to the lug 15' of the abutment 15, with the short terminal 24 disposed above the abutment 15 and provided with the operating handle 25. The outer portion of the clamping member is therefore eccentric of the abutment 15, and is disposed when moved to the position, as shown in Fig. 2, to clamp the free ends 20 and 21 of the spring metal band 17 upon the end of the film F, and thus retain the film in clamped position.

When it is desired to release the inner end of the film F, the film roll being converted into the supply reel and placed upon the disk 7 within the casing 1, the inner terminal of the film F which is threaded through the support 30, between the rollers 27 carried by the casing 1, may be withdrawn and fed through the projector as in the usual manner, to the lower receiving reel 13, the end thus removed being clamped between the terminals 21 and 20 of the lower receiving roller 13 whose clamping member 22 is manipulated to assume the position as shown in Fig. 2 and thus retain the end so that the film can be wound upon the lower reel 13 from the horizontally disposed upper reel and carried by the spring metal band 17.

The film guiding roller 28, as clearly shown in Fig. 8, is carried in the upper forked end 29 of the inclined supporting bar or arm 30, the clamping device 31 carrying such bar or arm 30 and providing a means for detachably connecting the guide roller 28 in the proper position relatively to the film supporting disk 7.

In order to properly operate the respective supply supporting disk 7 and the lower film receiving reel 13 in synchronism, a belt 32 is passed around the pulley 6 of the disk 7 and over the respective guide pulleys 33 and 34 carried by the brace 3, said belt 32 being trained over the pulley 14 of the lower reel 13, and held taut by means of the guide pulley 35 which is carried by the arm 36 pivoted to the brace 3 and held resiliently by means of the spring 37. Thus the spring 37 exerts a slight tension upon the arm 36 and roller 35 to hold the belt 32 nearer the projector in a taut condition so that there is no slipping motion between the respective pulleys 6 and 14 during the manipulation of the projector.

Any means of transmitting power from the projector mechanism to the lower or in fact to the upper reel may be provided, the same not constituting any portion of the present invention.

From the foregoing description, taken in connection with the drawings it is evident that with a reel constructed according to the present invention, that the film may be removed from the center of the roll thereof and wound upon a similar reel, and thus the necessity of rewinding the reel after it passes through the projector, is dispensed with, and that the time occupied in such rewinding is thus saved, while the extra wear upon the film due to such rewinding, is thus prevented.

What is claimed is:

1. In a machine of this character, a film carrying reel, comprising a disk, a fixed hub concentrically thereof, a resilient band connected to said hub and having overlapping free terminals and a pivoted member carried by the hub for engaging the free terminals of the clamping band to hold said terminals in film clamping position, the normal tension of said free terminals being toward separation.

2. In a machine of this character, a film carrying reel comprising a disk, a fixed hub concentrically of the disk, said hub being provided with two eccentrically disposed recessed portions in the periphery thereof, a radial extension disposed from the periphery of the hub at the opposite side to the recesses thereof, a resilient band disposed concentrically of the hub and connected to the radial lug, the free ends of said resilient band being disposed in overlapping relation and normally tensioned toward separation, and means connected to the hub upon the recessed portion thereof for actuating the free terminals into clamping and releasing position.

3. In a machine of this character, a film carrying reel comprising a disk, a fixed hub concentrically of the disk, said hub being provided with two eccentrically disposed recessed portions in the periphery thereof, a radial extension disposed from the periphery of the hub at the opposite side to the recesses thereof, a resilient band disposed concentrically of the hub and connected to the radial lug, the free ends of said resilient band being disposed in overlapping relation and normally tensioned toward separation, and means connected to the hub upon the recessed portion thereof for actuating the free terminals into clamping and releasing position, said last means being disposed upon and eccentrically of the hub.

4. In a machine of this character, a film carrying reel comprising a disk, a fixed hub concentrically of the disk, said hub being provided with two eccentrically disposed recessed portions in the periphery thereof, a radial extension disposed from the periphery of the hub at the opposite side to the recesses thereof, a resilient band disposed concentrically of the hub and connected to the radial lug, the free ends of said resilient band being disposed in overlapping relation and normally tensioned toward separation, and a terminal engaging and releasing member pivoted eccentrically of the hub and in coöperable relation to the inner free terminal of the clamp.

In testimony that I claim the foregoing as my own, I have hereto affixed my signature in the presence of two witnesses.

PAUL U. MASCHER.

Witnesses:
EVERETT L. LYON,
CLARA L. MORROW.

Copies of this patent may be obtained for five cents each, by addressing the "Commissioner of Patents, Washington, D. C."